United States Patent Office 3,655,844
Patented Apr. 11, 1972

3,655,844
PROCESS FOR THE MANUFACTURE OF SHAPED STRUCTURES WITH IMPROVED DYE AFFINITY
Hans Hoyer, Frankfurt am Main, Gunter Keil, Lorsbach, Taunus, and Wilhelm Happe, Schwalbach, Taunus, Germany, assignors to Farbwerke Hoechst Aktiengesellschaft vormals Meister Lucius & Bruning, Frankfurt am Main, Germany
No Drawing. Continuation-in-part of application Ser. No. 619,183, Mar. 28, 1967. This application Nov. 18, 1969, Ser. No. 877,816
Claims priority, application Germany, Mar. 16, 1966, F 48,665
Int. Cl. B29c 25/00; C08g 17/00; D06m 5/06
U.S. Cl. 264—78                              5 Claims

ABSTRACT OF THE DISCLOSURE

In the manufacture of copolyesters from terephthalic acid or the low molecular weight alkyl esters thereof and ethylene glycol, definite mercaptals and/or thioketals are incorporated into the macromolecule by ester linkage. The polyesters are shaped from the melt and sulfonic acid groups are produced in the shaped structures by an oxidative after-treatment. The structures have a high affinity for cationic substances.

---

The present application is a continuation-in-part of application Ser. No. 619,183 now abandoned.

This invention relates to a process for the manufacture of shaped structures from copolyesters of terephthalic acid and precursors of sulfonic groups which are incorporated in the desired polymer molecule.

U.S. Pat. 3,018,272 discloses cation-active polyesters containing sulfonate groups. In order to dye these polyesters to deep tints with cationic dyestuffs these polyesters must contain a relatively high amount of sulfonate groups in the polymer molecule. The dyeings obtained are not very fast to light and must be stabilized by additives (cf. S. B. Maerov and H. Kobsa, Textile Research Journal (1961) pages 697–703).

It has now been found that shaped structures can be produced from copolyesters of terephthalic acid having pendant sulfur group containing precursor groups which yield sulfonic acid upon specific oxidation of these groups in the polymer molecule. Polycondensation of terephthalic acid or the low molecular weight alkyl esters thereof with ethylene glycol is carried out according to known methods, adding however 0.3 to 3% by weight, calculated on terephthalic acid, of a mercaptal and/or thioketal containing free or esterified carboxyl group containing compound or alcoholic hydroxyl groups and having the general Formula I

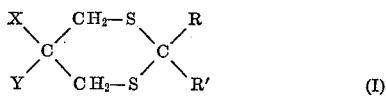
(I)

in which R stands for hydrogen, a straight chain or branched alkyl radical—for example an alkyl radical selected from the group consisting of methyl, ethyl, n-propyl, i-propyl, n-butyl, i-butyl, tert. butyl, pentyl and hexyl—an aryl radical—for example the phenyl radical—an alkylaryl radical—for example the benzyl or tolyl radical—a halogeno aryl radical—for example the chloro-, bromo- or iodophenyl radical—or an alkoxyaryl radical—for example the methoxyphenyl radical—and R' has the same meaning as R or together with R is a member of a carbocyclic ring—for example the cyclohexane ring; X is a hydroxyl or a hydroxyl group containing aliphatic radical, free or esterified carboxyl or a free or esterified carboxyl group containing aliphatic or aromatic radical—for example X is a member selected from the group consisting of

—OH, —CH₂OH, —CH₂O—CH₂—CH₂—OH

—CH₂—CH₂—OH, —CH₂—CH₂—CH₂—OH

—CH₂—CH(CH₃)—OH

—CH₂—CH₂—CH₂—CH₂—OH

—CH₂—C(CH₃)₂—OH, —COOH, —COOCH₃

—CH₂—COOH, —CH₂—COOCH₃

—CH₂—CH₂—COOH, —CH₂—CH₂—COOCH₃

—CH₂—CH₂—CH₂—COOH

—CH₂—CH₂—CH₂—COOCH₃

—CH₂—CH(CH₃)—COOH

—CH₂—CH₂—CH₂—CH₂—COOH

—C₆H₄—COOH(p), —C₆H₄—COOCH₃(p)

—CH₂—C₆H₄—COOH(p)

—CH₂—C₆H₄—COOCH₃(p)

—CH₂—CH₂—C₆H₄—COOH(p)

—CH₂—CH₂—C₆H₄—COOCH₃(p)

and Y having the same meaning as X with the exception of the hydroxyl group or being hydrogen; shaping the polycondensation product obtained from the melt and subjecting the shaped structures to an oxidative after-treatment with chlorine or bromine in the presence of water or with chlorous acid, whereby the precursor groups

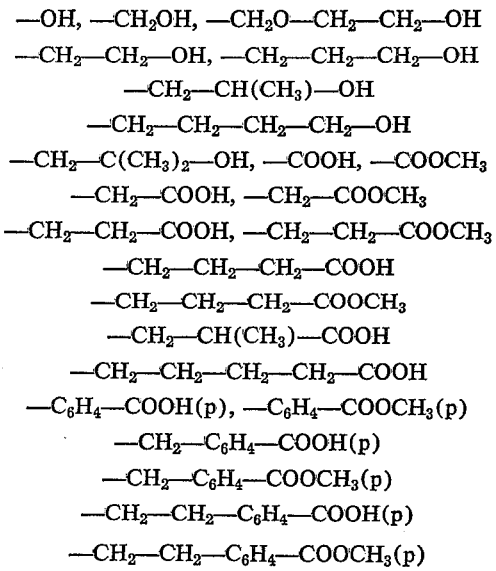

are oxidized to yield the group

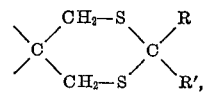

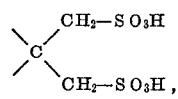

In the polycondensation according to the invention with terephthalic acid or the low molecular weight alkyl esters thereof, preferably dimethyl terephthalate, and ethylene glycol, the mercaptals and/or thioketals containing free or esterified carboxyl groups and/or alcoholic hydroxyl groups are incorporated into the polymer molecule of the polyethylene glycol terephthalate by ester linkage via the carboxyl groups and/or alcoholic hydroxyl groups. Instead of terephthalic acid or the esters thereof there may also be used other derivatives capable of forming esters and instead of ethylene glycol derivatives thereof may be used such as ethylene oxide or ethylene carbonate. In general, the mercaptals or thioketals can be added to the mixture of a previous ester interchange reaction; it is preferable, however, to add these compounds prior to or in the course of the polycondensation so that they are not subjected longer than necessary to the high reaction temperature.

The polycondensation is performed according to known methods using the conventional catalysts, for example compounds of zinc, calcium, manganese and antimony, and stabilizers such as phosphorous acid or triphenyl phosphite. Pigments or delustering agents may also be added.

The mercaptals and/thioketals containing free or esterified carboxylic groups and/or alcoholic hydroxyl groups which are incorporated by a condensation reaction in the polyester polymer correspond to the general Formula I given above. The mercaptals have the general Formula II

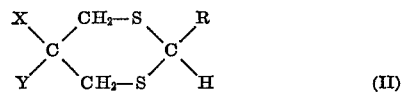

in which R stands for hydrogen, a straight chain or branched alkyl radical, preferably an alkyl radical having 1 to 6 carbon atoms, for example methyl, ethyl, propyl, iso-propyl, butyl, iso-butyl, tert.-butyl, pentyl, hexyl, an aromatic radical which may be substituted, for example phenyl, chlorophenyl, bromophenyl, or iodophenyl. X stands for the hydroxyl group or an aliphatic radical carrying a hydroxyl group, for example —CH$_2$OH,

—CH$_2$—O—CH$_2$—CH$_2$—OH

—CH$_2$—CH$_2$OH, —CH$_2$—CH$_2$—CH$_2$OH, the free or esterified carboxyl group or an aliphatic or an aromatic radical carrying a free or esterified carboxyl group, for example —CH$_2$—COOH, —CH—COOCH$_3$,

—CH$_2$—CH$_2$—COOH

—CH$_2$—CH$_2$—COOCH$_3$, —C$_6$H$_4$—COOH(p),

—C$_6$H$_4$—COOCH$_3$ and Y stands for hydrogen or has the same meaning as X with the exception of the hydroxyl group.

Suitable mercaptals are, for example, compounds of the following formulae:

The thioketals of the general Formula I have the same structure and carry the same substituents R, X and Y as the mercaptals of Formula II specified above the exception that R' means substituents given for R except for hydrogen. R and R' together may be members of a ring, preferably a carboxylic ring, for example the cyclohexane ring.

Suitable thioketals are, for example, compounds of the following formulae:

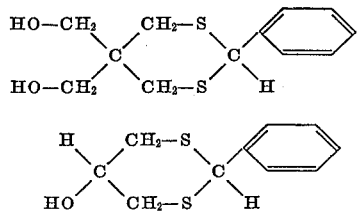

The mercaptals and thioketals to be incorporated into the polyester by condensation are compounds containing two sulfur atoms in the molecule. Accordingly, there can—whenever less advantageous—be incorporated by condensation also organic disulfides containing reactive free or esterified carboxyl groups and/or hydroxyl groups. This class of compounds has, however, the drawback that many representatives thereof undergo decomposition at the high temperatures of the polycondensation or in the melt spinning so that only a few stable organic disulfides can be used for carrying out the process on an industrial scale. A disulfide of the type is, for example, the 4,4-bis-hydroxymethyl-1,2-dithiacyclopentane.

The compounds to be incorporated by condensation are added to the polycondensation mixture in an amount of from 0.3 to 3% by weight, preferably 1 to 2% by weight, calculated on the terephthalic acid. The copolymer obtained is shaped from the melt in usual manner to yield structures such as filaments, fibers, monofilaments, films or chips.

The subsequent oxidative aftertreatment is carried out with the shaped structures. In this treatment sulfonic acid groups are formed in the polymer molecule. The oxidative aftertreatment can be carried out with chlorine, bromine or iodine in the presence of water. It is advantageous to use solutions of chlorine or bromine in water or aqueous acids. Alternatively, aqueous solutions of substances yielding chlorine or bromine can be used, for example solutions of N-bromo- or N-chloro-succinimide, N-bromophthalimide, or sodium para - toluenesulfonchloramine (chloramine T).

Sulfuryl chloride or thionyl chloride in a solvent miscible with water, for example dioxane or glacial acetic acid, also produce acid groups in the polymer molecule after a treatment with water. The oxidative after treatment can be carried out with special advantage with salts of chlorous acid, for example sodium chlorite or potassium chlorite in the form of acid aqueous solutions. The shaped structures are advantageously treated for 5 to 30 minutes at a temperature in the range of from 80 to 125° C. with an aqueous solution of about 1% strength of the aforesaid salts in the presence of small amounts of a mineral acid.

It is of advantage concomitantly to use known substances having a "carrier action," such as chlorinated aromatic compounds, alkyl-aromatic compounds, or aromatic ethers. It has been surprising that the mercaptal and thioketal linkages are not decomposed in the polycondensation and that, therefore, crosslinked polycondensation products are not formed as could be expected. On the contrary, spinnable polyesters modified with sulfur and having a high degree of whiteness are obtained which can be spun into filaments having good mechanical and textile properties.

By the oxidative aftertreatment of the shaped structure made from the above described polyester precursors pendant sulfonic acid groups are introduced into the polymer molecule in a relatively high concentration, for example 100 to 200 equivalents per 10$^6$ grams of polycondensate. The reaction taking place thereby can be most readily envisioned by referring to the following formula:

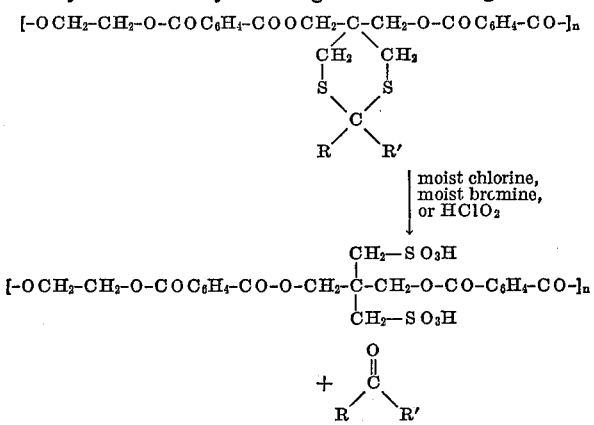

As can be seen from this reaction scheme, the polymer chain is not cleaved by this oxidation. Therefore, the viscosity of the resultant polymer containing sulfonic acid groups is identical, or almost identical, respectively, to the viscosity of the precursor polymer.

In contradistinction thereto, the viscosity of a (co)-polyester containing sulfur groups in the polymer chain is considerably decreased by an analogous oxidation; for example, a copolyester having as sulfur group containing radical in the polymer chain the radical

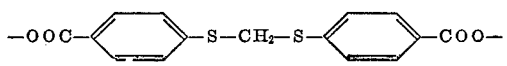

and being of the solution viscosity 0.71 (measured in a 1% per weight solution in phenol-tetrachloroethane= 3:2) is changed by an oxidation according to our process to a polyester of the solution viscosity 0.59. This is due to the breakage of the polymer chains at the sulfur atoms:

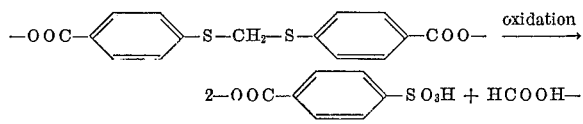

The technological and textile properties of the shaped structures + are substantially retained. The structures + from polyesters of our invention obtained by the process according to the invention have a high affinity for cationic substances. As basic dyestuffs are substances containing cations as the essential ion, the structures can be colored with them to deep tints in an easy manner, the colorations obtained being fast to light. In the same manner cationic substances having an antistatic effect, such as the reaction product of stearoyl chloride, diethylene triamine and dimethyl sulfate, or cationic optical brighteners, for example derivatives of benzoxazole, are fixed on the shaped structures.

As compared with the polyesters containing sulfonate groups referred to at the beginning, the polyesters of the invention have a higher molecular weight because by the present process very high degrees of polycondensation can be reached within a time of reaction which is shorter than the time required for preparing a non-modified polyethylene terephthalate having a comparable degree of polycondensation. Moreover, a low concentration of sulfur-containing comonomer is sufficient to obtain a polyester having a good dyeing capacity towards cationic dyestuffs. It is surprising that the colorations obtained are very fast to light, this being in contradiction to the colorations of the polyesters containing sulfonate groups described above.

The following examples serve to illustrate the invention but they are not intended to limit it thereto, the parts and percentages being by weight. The relative viscosity ($\eta_{rel.}$) was determined with solutions of 1% strength of the polyester in a mixture of phenol/tetrachlorethane (3:2) at 25° C.

EXAMPLE 1

(a) In a vessel provided with a stirred and a distilling column the latter heated at 65–75° C., 2715 parts of dimethyl terephthalate, 2170 parts of ethylene glycol and 0.6788 part of zinc acetate were heated at 150 to 210° C. until the separation of methanol was terminated. The excess of ethylene glycol was then distilled off by temperature increase.

(b) In a vessel provided with a stirrer and a condenser and which contains 800 parts of the precondensation product, essentially consisting of terephthalic acid bis-($\beta$-hydroxyethyl ester) (corresponding to 628 parts of dimethyl terephthalate), the contents of the vessel were heated for 15 minutes at 250° C. at atmospheric pressure in the presence of 0.1884 part of antimony trioxide and 6.28 parts of 2.2 - dimethyl - 5.5-bis-hydroxymethyl-1.3-dithiacyclohexane. At the same temperature the pressure in the reaction vessel was then gradually reduced to 0.4 to 0.1 mm. of mercury within 90 minutes. The polycondensation taking place with separation of ethylene glycol was terminated by heating the reaction mixture at 278° C. under a pressure of 0.4 to 0.1 mm. of mercury. The time required under the specified conditions to reach the desired final viscosity is referred to in this and in the following examples as "polycondensation period." After a polycondensation period of 40 minutes, a very bright copolyester was obtained having a crystallization temperature of 112° C., a melting point of 260° C. and a relative viscosity of 1.835. It contained 0.27% of sulfur.

(c) The copolyester was spun at a temperature of at most 290° C. through a spinning nozzle having 24 orifices at a draw-off speed of about 1000 m./minute and the fibers were then drawn to 3.65 times their original length. A bundle of fibers of 48.6 denier was obtained having a tensile strength of 3.5 g./denier and an elongation at break of 24.4%.

(d) 5 parts of the sulfur-modified polyethylene terephthalate fibers were treated for 30 minutes at 125° C. in an autoclave with 200 parts of water containing 2 parts of sodium chlorite (50%) and having a pH of 3.5. The material was then thoroughly rinsed in hot and cold water. It contained 173 equivalents of acid groups per $10^6$ grams of polycondensation product.

According to a variant of this method, 5 parts of the modified polyethylene terephthalate fibers were boiled for 30 minutes in a mixture consisting of 250 parts of water, 2.5 parts of sodium chlorite (50%) and 1 part of o-dichlorobenzene. Instead of o-dichlorobenzene, diphenyl oxide may be used.

(e) 5 parts of the oxidized and modified polyethylene terephthalate material was colored for one hour at 125° C. in a bath containing the following constituents: 200 parts of water, 0.1 part of 30% acetic acid and 0.1 part of a cationic dyestuff having the following formula:

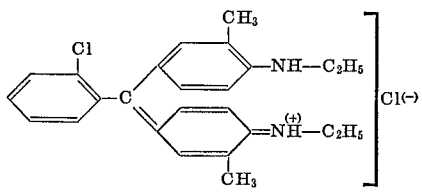

The blue coloration obtained was washed for 10 minutes at 60° C. with a non-ionic detergent, i.e. ethylene oxide poly-addition products. It had an excellent fastness to wet processing and rubbing.

When instead of the above dyestuff a dyestuff of the following constitution was used:

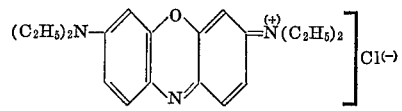

a greenish-blue coloration was obtained having very good fastness properties. Using a dyestuff of the following structure

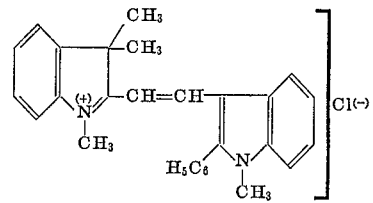

a fast orange tint was obtained. The dyestuff of the following constitution

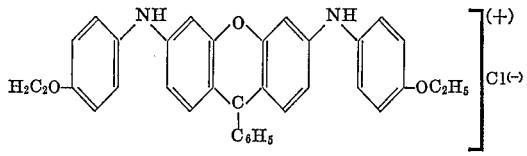

colored the fibers to a reddish blue tint having excellent fastness properties.:

The dyestuff of the formula

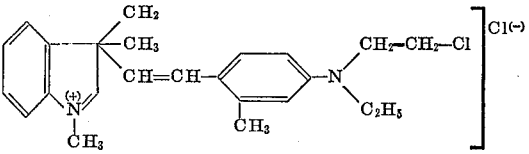

brought about a deep and fast red coloration whereas the compound

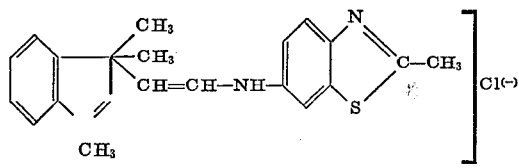

colored the material to a yellow tint.

(f) When instead of the coloring cationic compounds used in Example 1(e) one part of the reaction product of stearoyl chloride, diethylene triamine and dimethylsulfate was used, a permanent antistatic finish was obtained which was fast to washing and conferred upon the material a soft handle.

(g) 5 parts of the material oxidized as described in Example 1(d) were boiled for 30 minutes in a bath containing in 200 parts of water 0.2 part of a compound of the following structure:

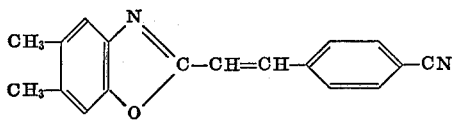

An optically brightened, weakly bluish fluorescent finish was obtained which was fast to washing.

EXAMPLE 2

(a) 800 parts of a preconadensation product obtained as described in Example 1(a) (corresponding to 560 parts of dimethyl terephthalate) and 11.2 parts of 2.2-dimethyl 5.5-bishydroxy-methyl - 1.3 - dithiacyclohexane were polycondensed in the presence of 0.1680 part of antimony trioxide as described in Example 1(b). After a polycondensation period of 45 minutes, a copolyester was obtained having a good color, a crystallization temperature of 122.4° C., a melting point of 259° C., and a relative viscosity of 1.835.

(b) The fibers obtained from the aforesaid copolyester by spinning from the melt at 285° C. and drawing to 3 times the original length had a strength of 2.6 g./denier and an elongation at break of 14.2%. A fabric made from the fibers had a very low tendency to pilling.

(c) 5 parts of the fibers were treated for 30 minutes at 35° C. with a solution of 250 parts of water and 1.25 parts of bromine and then for 30 minutes at 20° C. with a solution of 2.5 parts of ammonia in 250 parts of water. The fibers thus treated had a high proportion of acid groups.

Instead of a solution of bromine in water, 5 parts of the sulfur-modified polyethylene terephthalate fibers were treated first for 5 minutes at 50° C. with 250 parts of water saturated with chlorine and then for 30 minutes at 20° C. with 2.5 parts of sodium hydroxide in 250 parts of water.

The oxidation was also carried out advantageously in the following manner:

5 parts of the modified polyethylene terephthalate fibers were treated for 30 minutes at 20° C. with a solution of 13 parts of chlorine and 25 parts of water in 225 parts of acetic acid or with a solution of 2.8 parts of chlorine in 250 parts of 25% hydrochloric acid. The aftertreatment was carried out as described above with aqueous ammonia or aqueous sodium hydroxide solution.

When 5 parts of the sulfur-modified fibers were treated for 30 minutes at 20° C. with a solution of 12.5 parts of sulfuryl chloride in 250 parts of dioxane, rinsed with dioxane and water and then washed for 30 minutes with a solution of 2.5 parts of sodium hydroxide in 250 parts of water, the fibers contained an increased proportion of acid groups.

(d) The polyethylene terephthalate fibers modified and oxidized as described above were reacted with cationic substances as described in Example 1(e), 1(f) and 1(g).

EXAMPLE 3

800 parts of the precondensation product obtained according to Example 1(a) (corresponding to 718 parts of dimethyl terephthalate) were polycondensed as described in Example 1(b) in the presence of 0.2154 part of antimony trioxide and 7.18 parts of 2-phenyl-5.5-bis-hydroxymethyl-1.3-dithiacyclohexane. After a polycondensation period of 40 minutes, a polycondensation product was obtained having a good color, a crystallization temperature of 118° C., a melting point of 256° C. and a relative viscosity of 1.850. It had a sulfur content of 0.24%.

The fibers obtained from the polycondensation product by spinning from a melt and drawing these to 3.65 times the original length had a strength of 3.5 grams/denier and an elongation at break of 30.5%.

By an aftertreatment of the fibers with sodium chlorite analogous to Example 1(d), 166 equivalents of acid groups were produced per $10^6$ grams of polycondensation product.

The oxidized fibers had a strong affinity for cationic compounds, for example dyestuffs, substances having an antistatic effect or optical brighteners.

EXAMPLE 4 (OUTSIDE OF OUR CLAIMS)

(a) 743 parts of a precondensation product prepared as described in Example 1(a) (corresponding to 670 parts of dimethyl terephthalate) were polycondensed in the presence of 0.2010 part of antimony trioxide and 3.35 parts of 4.4-bis-hydroxymethyl - 1.2 - dithiacyclopentane. After a polycondensation period of 50 minutes, a copolyester was obtained having a good color and a relative viscosity of 1.776, a crystallization temperature of 115° C., a melting point of 263° C. and a sulfur content of 0.18%.

(b) The fibers produced from the copolyester by spinning these from the melt and drawing to 3.65 times the original length had a strength of 3.5 grams/denier and an elongation at break of 35.2%.

(c) By an oxidation with sodium chlorite as defined in Example 1(d), a fibrous material was obtained which contained 126 equivalents of acid groups per $10^6$ grams of polycondensation product.

(d) When the sulfur-modified polyethylene terephthalate fibers were treated in the moist state for 30 minutes at 20° C. with gaseous chlorine and then washed with ammonia solution of 1% strength, fibers were obtained having a high affinity for cationic compounds.

(e) 5 parts of the fibers modified with disulfide were heated for 30 minutes at 80° C. in a solution containing 5 parts of N-bromo-succinimide in 250 parts of water and then rinsed with ammonia solution of 1% strength. The fibers obtained had likewise a high affinity for cationic substances. Instead of N-bromo-succinimide N-chloro-succinimide or the sodium salt of N-chloro-p-toluene-sulfoamide can be used.

What we claimed is:

1. A process for the manufacture of shaped structures from copolyesters of terephthalic acid containing pendant sulfonic acid groups in the polymer molecule which comprises carrying out the polycondensation of terephthalic acid or the low molecular weight alkyl esters thereof with ethylene glycol and with the addition of 0.3 to 3% by weight, calculated on the terephthalic acid, of a compound of the general Formula I

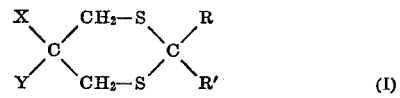

in which R and R′ are members selected from the group consisting of hydrogen, methyl, ethyl, n-propyl, i-propyl, n-butyl, i-butyl, tert.-butyl, pentyl, hexyl, phenyl, benzyl, tolyl, chlorophenyl, bromophenyl, iodophenyl, and methoxyphenyl and X is a member selected from the group consisting of —OH, —CH$_2$OH, —CH$_2$O—CH$_2$—CH$_2$—OH, —CH$_2$—CH$_2$—OH,
—CH$_2$—CH$_2$—CH$_2$—OH, —CH$_2$—CH(CH$_3$)—OH,
—CH$_2$—CH$_2$—CH$_2$—CH$_2$—OH, CH$_2$—C(CH$_3$)$_2$—OH,
—COOH, COOCH$_3$, —CH$_2$—COOH, —CH$_2$—COOCH$_3$,
—CH$_2$—CH$_2$—COOH, —CH$_2$—CH$_2$—COOCH$_3$,
—CH$_2$—CH$_2$—CH$_2$—COOH,
—CH$_2$—CH$_2$—CH$_2$—COOCH$_3$,
—CH$_2$—CH(CH$_3$)—COOH,
—CH$_2$—CH$_2$—CH$_2$—CH$_2$—COOH, C$_6$H$_4$—COOH(p),
C$_6$H$_4$—COOCH$_3$(p), —CH$_2$—C$_6$H$_4$—COOH(p),
—CH$_2$C$_6$H$_4$—COOCH$_3$(p),
—CH$_2$—CH$_2$—C$_6$H$_4$—COOH(p),
—CH$_2$—CH$_2$—C$_6$H$_4$—COOCH$_3$(p), and Y having the same meaning as X with the exception of the hydroxyl group or being hydrogen, shaping the polycondensation product obtained from the melt and subjecting the shaped structures to an oxidative after-treatment from 5 to 30 minutes with a member selected from the group consisting of moist chlorine, moist bromine and chlorous acid, whereby the groups

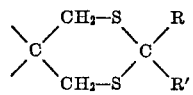

are oxidized to yield the group

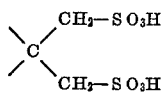

2. A process for the manufacture of shaped structures from copolyesters of terephthalic acid containing pendant sulfonic acid groups in the polymer molecule which comprises carrying out the polycondensation of terephthalic acid or the lower molecular weight alkyl esters thereof with ethylene glycol and with the addition of 0.3 to 3% by weight, calculated on the terephthalic acid, of a compound of the general formula (I)

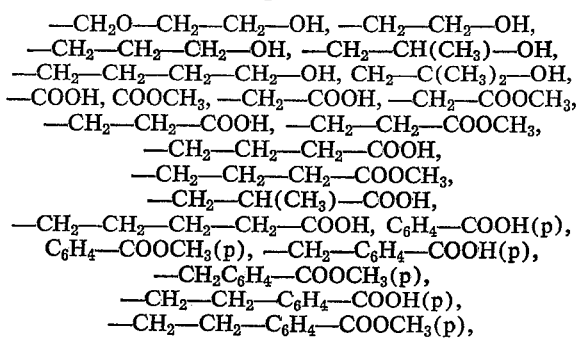

in which R and R' are members of the cyclohexane ring and X being a member selected from the group consisting of —OH, —CH$_2$OH, —CH$_2$—O—CH$_2$—CH$_2$—OH, —CH$_2$—CH$_2$—OH, —CH$_2$—CH$_2$—CH$_2$—OH,
—CH$_2$—CH(CH$_3$)—OH,
—CH$_2$—CH$_2$—CH$_2$—CH$_2$—OH,
—CH$_2$—C(CH$_3$)$_2$—OH, —COOH, —COOCH$_3$,
—CH$_2$—COOH, —CH$_2$—COOCH$_3$,
—CH$_2$—CH$_2$—COOH, —CH$_2$—CH$_2$—COOCH$_3$,
—CH$_2$—CH$_2$—CH$_2$—COOH,
—CH$_2$—CH$_2$—CH$_2$—COOCH$_3$,
—CH$_2$—CH(CH$_3$)—COOH,
—CH$_2$—CH$_2$—CH$_2$—CH$_2$—COOH,
—C$_6$H$_4$—COOH(p), —C$_6$H$_4$—COOCH$_3$(p),
—CH$_2$—C$_6$H$_4$—COOH(p), —CH$_2$—C$_6$H$_4$—COOCH$_3$(p),
—CH$_2$—CH$_2$—C$_6$H$_4$—COOH(p),
—CH$_2$—CH$_2$—C$_6$H$_4$—COOCH$_3$(p), and Y having the same meaning as X with the exception of the hydroxyl group or being hydrogen, shaping the polycondensation product obtained from the melt, and subjecting the shaped structures to an oxidative after-treatment from 5 to 30 minutes with a member selected from the group consisting of moist chlorine, moist bromine and chlorous acid, whereby the groups

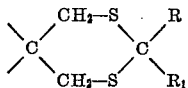

are oxidized to yield the group

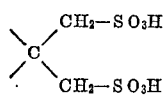

3. The process of claim 1, where the oxidative after-treatment is carried out in the presence of a small amount of a carrier selected from the group consisting of o-dichlorobenzene, and diphenylene oxide.

4. The process of claim 2, wherein the oxidative after-treatment is carried out in the presence of a small amount of a carrier selected from the group consisting of o-dichlorobenzene, and diphenylene oxide.

5. In the method of dyeing polyesters with a cationic dyestuff the improvement which consists in introducing pendant sulfonic acid groups into a polyester precursor molecule containing the polymer chain the repeating unit

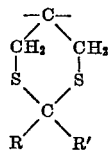

wherein R and R' are members selected from the group consisting of hydrogen, methyl, ethyl, n-propyl, i-propyl, n-butyl, i-butyl, tert.-butyl, pentyl, hexyl, phenyl, benzyl, tolyl, chlorophenyl, bromophenyl, iodophenyl and methoxyphenyl and R, R' and the carbon atom to which they are attached form a cyclohexane ring, by oxidizing from 5 to 30 minutes said precursor molecule with a member selected from the group consisting of moist chlorine, moist bromine and chlorous acid.

References Cited

UNITED STATES PATENTS

| | | | |
|---|---|---|---|
| 3,033,824 | 5/1962 | Huffman | 260—75 |
| 3,164,566 | 1/1965 | Horn | 260—75 |
| 3,238,180 | 3/1966 | Wiloth | 260—75 |
| 3,418,066 | 12/1968 | Caldwell et al. | 260—75 |

FOREIGN PATENTS

| | | | |
|---|---|---|---|
| 652,277 | 11/1962 | Canada | 264—211 |

ROBERT F. WHITE, Primary Examiner

J. R. THURLOW, Assistant Examiner

U.S. Cl. X.R.

8—115.5; 260—75; 264—83, 210 F, 234